Aug. 15, 1950 L. KRAFT 2,518,624
RACK STRUCTURE FOR GLAZIERS' VEHICLES
Filed Oct. 11, 1946 5 Sheets-Sheet 1

Inventor
Louis Kraft
By Arthur M. Nelson
Atty.

Aug. 15, 1950 L. KRAFT 2,518,624
RACK STRUCTURE FOR GLAZIERS' VEHICLES
Filed Oct. 11, 1946 5 Sheets-Sheet 2

Inventor
Louis Kraft

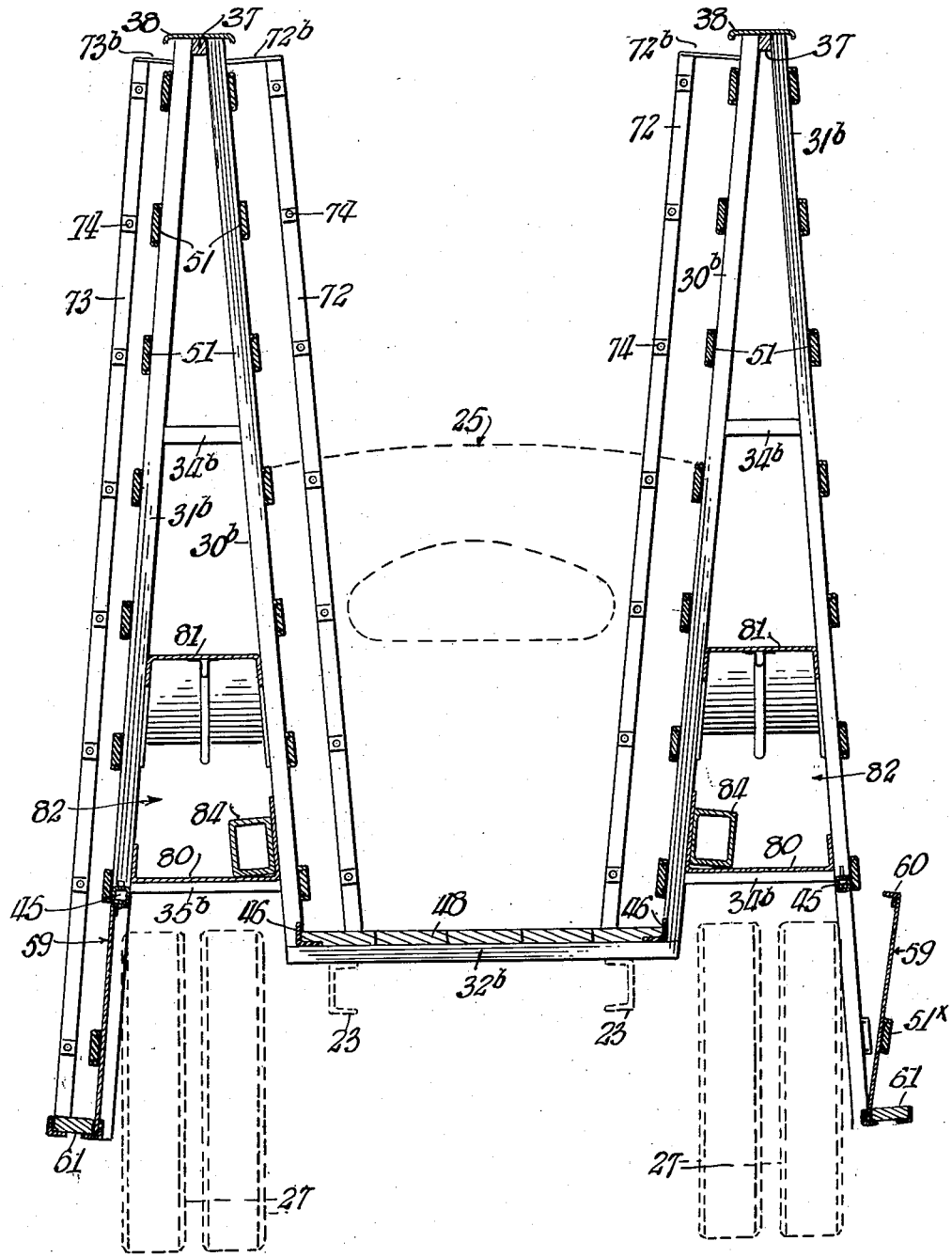

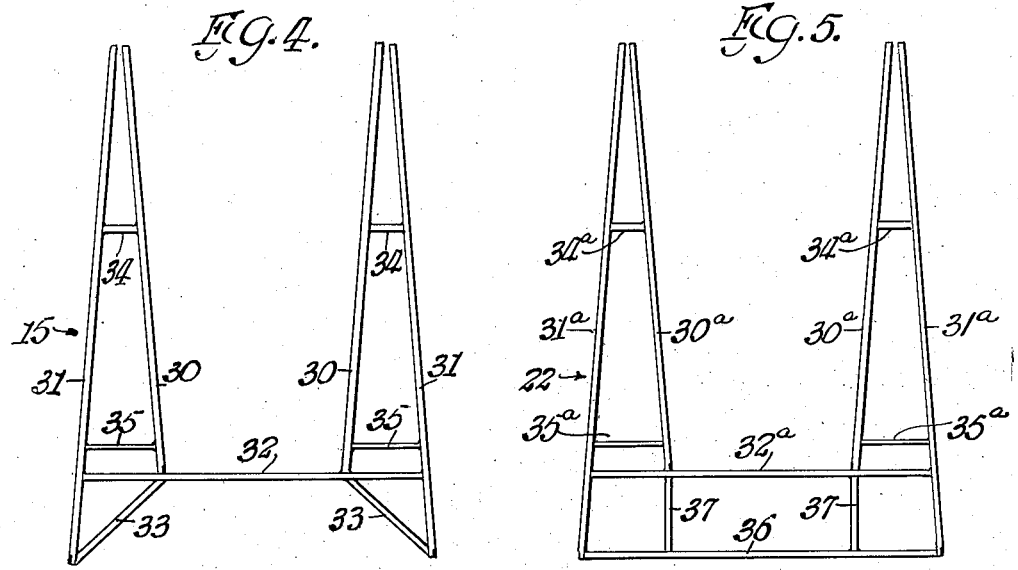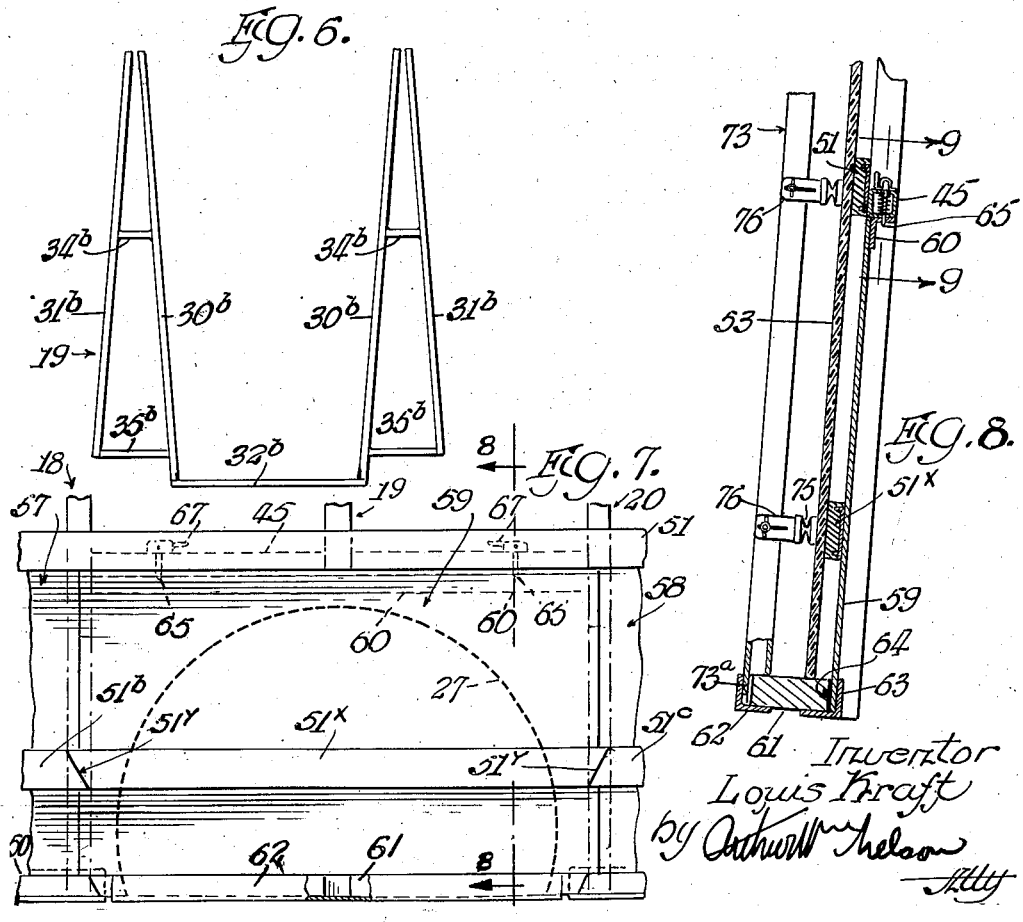

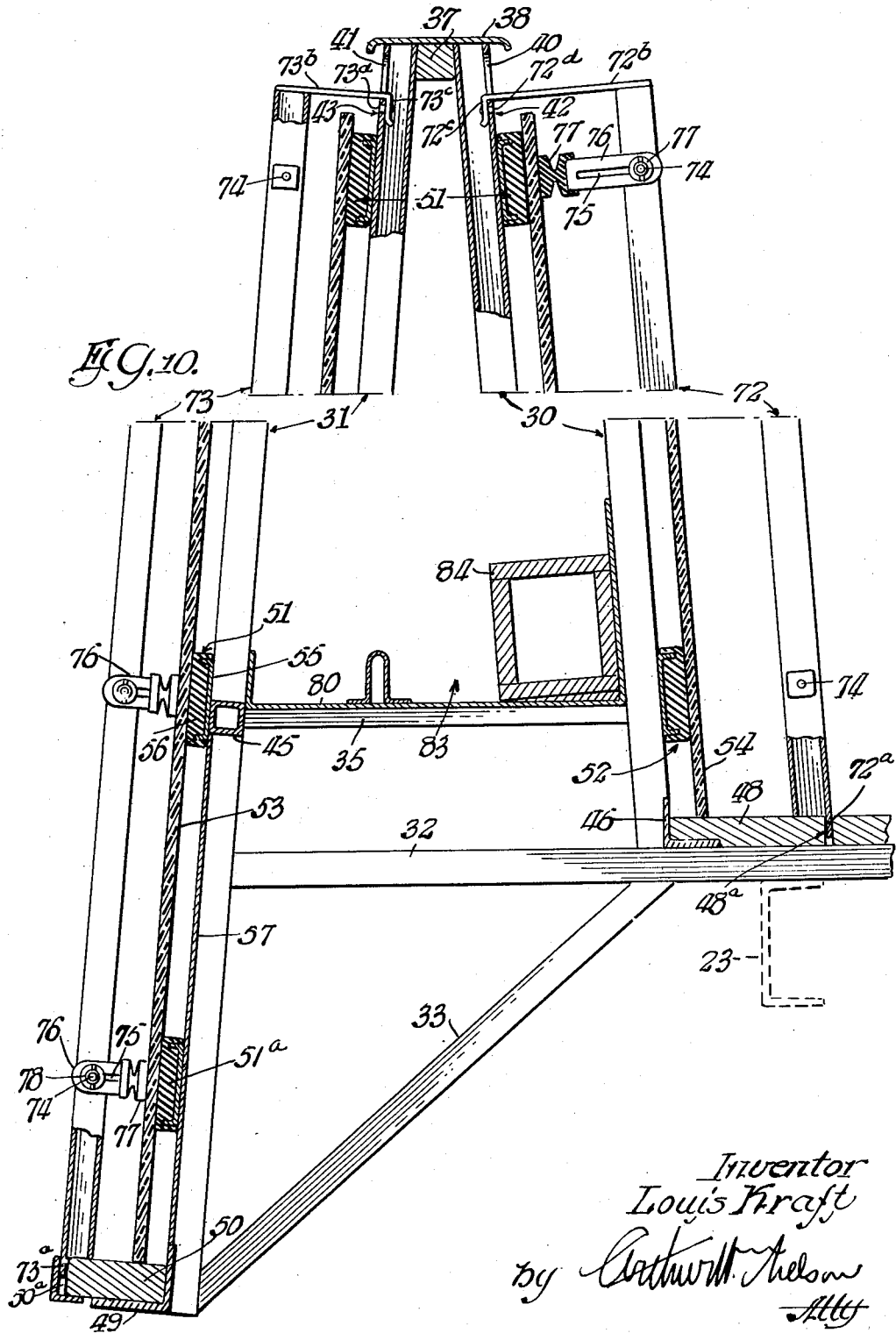

Patented Aug. 15, 1950

2,518,624

UNITED STATES PATENT OFFICE 2,518,624

RACK STRUCTURE FOR GLAZIERS' VEHICLES

Louis Kraft, East Chicago, Ind.

Application October 11, 1946, Serial No. 702,721

19 Claims. (Cl. 211—13)

This invention relates to improvements in rack structures for glazier's vehicles and it consists of the matters hereinafter described and more particularly pointed out in the appended claims.

Panes of glass, such as used in store fronts and windows are relatively large in size and are transported in a generally upright, but leaning position in racks mounted on a vehicle, usually a motorized vehicle. In installing such panes, certain appurtenances, such as ladders, straight edges, rulers and the like are used and these must be carried by the vehicle in a position wherein they cannot come into contact with such panes but in which they must be accessible for easy removal and replacement. Such racks stand in a generally upright position and have considerable size. By way of illustration, such racks are generally somewhat over twelve (12) feet in length, ten (10) feet in height and eight (8) feet in width and parts of the rack at the outer sides thereof overhang and project into a plane below the axis of the rear wheels of the vehicle, upon which the rack structure as a whole is mounted.

One of the objects of the invention is to provide a rack structure of this kind for securely holding large panes of glass against movement, during the transportation of the same and into and from which structure such panes may be readily loaded for transport and unloaded at the place of installation.

Another object of the invention is to provide a rack structure of this kind, in which the glazier's tools and appurtenances are carried in a manner protecting the same against damage or engagement with the glass panes, but permitting a ready and convenient withdrawal and replacement of the same.

A further object of the invention is to provide in a rack structure of this kind, improved stationary stakes for the edgewise leaning support of large panes of glass and associated stakes for supporting the clamps that hold said panes in place and which associated stakes are adapted for attachment to and removal from parts of the stationary stakes and other parts of the structure by a combination of a lateral and longitudinal movement.

Also it is an object of the invention to provide in a rack structure of this kind, novel means forming a part thereof and which may be readily removed from the structure to give access for servicing the rear wheels, covered thereby and forming a part of the vehicle upon which the improved rack structure is mounted.

The above mentioned objects of the invention, as well as others, together with the advantages thereof, will more fully appear as the specification proceeds.

In the drawings:

Fig. 3 is a transverse vertical sectional view, on the scale of Fig. 2, through a part of the vehicle, in the plane of its rear wheels as taken on the line 3—3 of Fig. 1.

Figs. 4, 5 and 6 respectively are views in elevations of certain transverse frames embodied in the improved rack structure, on a scale smaller than that of Fig. 1 and each of which will be more fully referred to later.

Figure 1:
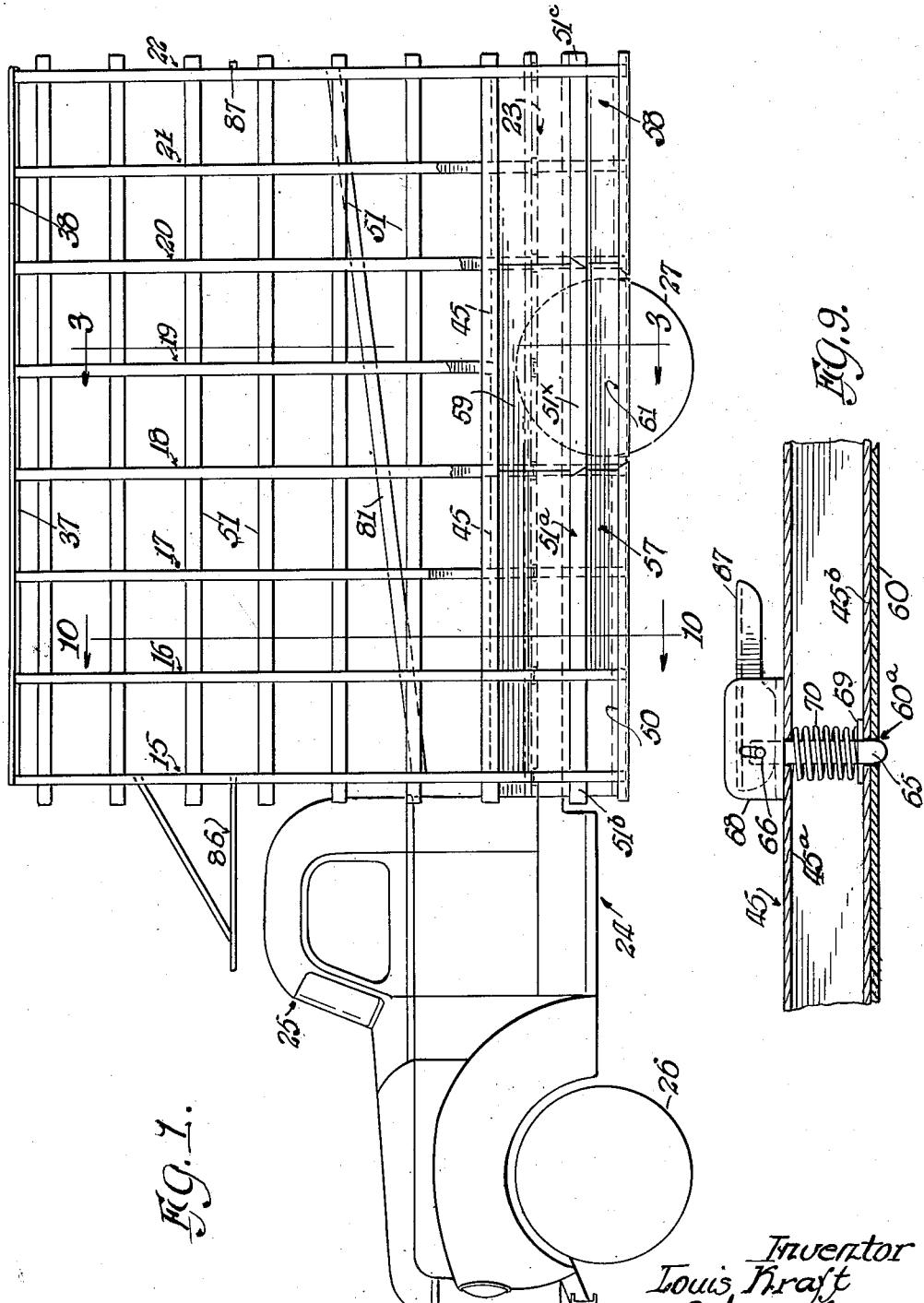
Fig. 1 is a view in side elevation of one form of rack structure embodying the invention when mounted upon a motor truck chassis to form a glazier's vehicle.

Fig. 7 is a fragmentary view in elevation of one of a pair of panels and adjacent parts embodied in the improved rack structure and covering the rear wheels of the associated vehicle and which panels are removable to give access to the wheels when requiring service, the scale of said Fig. 7 being greater than that of Fig. 1.

Fig. 8 is a detail vertical sectional view through the panel structure of Fig. 7 as taken on the line 8—8 and on a scale enlarged over that of Fig. 7.

Fig. 9 is a fragmentary vertical detail sectional view on an enlarged scale through parts shown in Fig. 8 as taken on the line 9—9 thereof and more particularly shows the means for detachably locking a wheel covering panel in place.

Fig. 10 is a fragmentary vertical sectional view through a side portion of the improved rack structure on a further enlarged scale as taken on the line 10—10 of Fig. 1.

Referring now in detail to the invention illustrated in the drawings, the improved rack structure, as appears in Fig. 1, embodies therein a plurality of longitudinally spaced, upright frames 15, 16, 17, 18, 19, 20, 21 and 22 respectively. These frames extend transversely of the longitudinal frame members 23 of the chassis of a transport vehicle 24, such as a motor truck, to the rear of the cab 25 thereof. The front and rear wheels of the truck are indicated at 26 and 27 respectively.

All of the frames 15 to 22 inclusive are quite similar in appearance. Frames 15, 16, 17, 18, 20 and 21 are alike in construction and one of them appears in Fig. 4. The frame 22, which is the rearwardmost frame, and best shown in Fig.

5, is different in construction at its bottom end only from said frames 15, 16, 17, 18, 20 and 21, while the frame 19, which is disposed in the transverse plane of the axis of the rear wheels 27 and which frame best appears in Fig. 6, is different in construction at the bottom from the other frames mentioned. Each frame is made of structural metal members welded together.

Each frame 15, 16, 17, 18, 20 and 21 respectively includes, at each side thereof, a pair of laterally spaced inner and outer stationary stakes 30 and 31 respectively, which converge from their bottom ends toward the top at opposite angles with respect to the perpendicular and are preferably made of square metal tubing. As best appears in Fig. 4 the outer stakes of both pairs thereof are the longer ones. The bottom ends of the inner stakes are welded to a cross sill 32 and the ends of said sill are welded each to a side of the outer stakes so that parts of said stakes extend a distance below the cross sill. The extremity of each of said stake parts is connected to the cross sill by the angle braces 33. The top ends of the stakes of each pair are spaced closely together and between said ends and the sill 32, said stakes are connected by top and bottom cross stays 34 and 35, which are welded at their ends to said stakes. The sill 32 of each of these frames rests upon and is fixed to longitudinally spaced points along the frame members 23 of the truck chassis.

Figure 2:
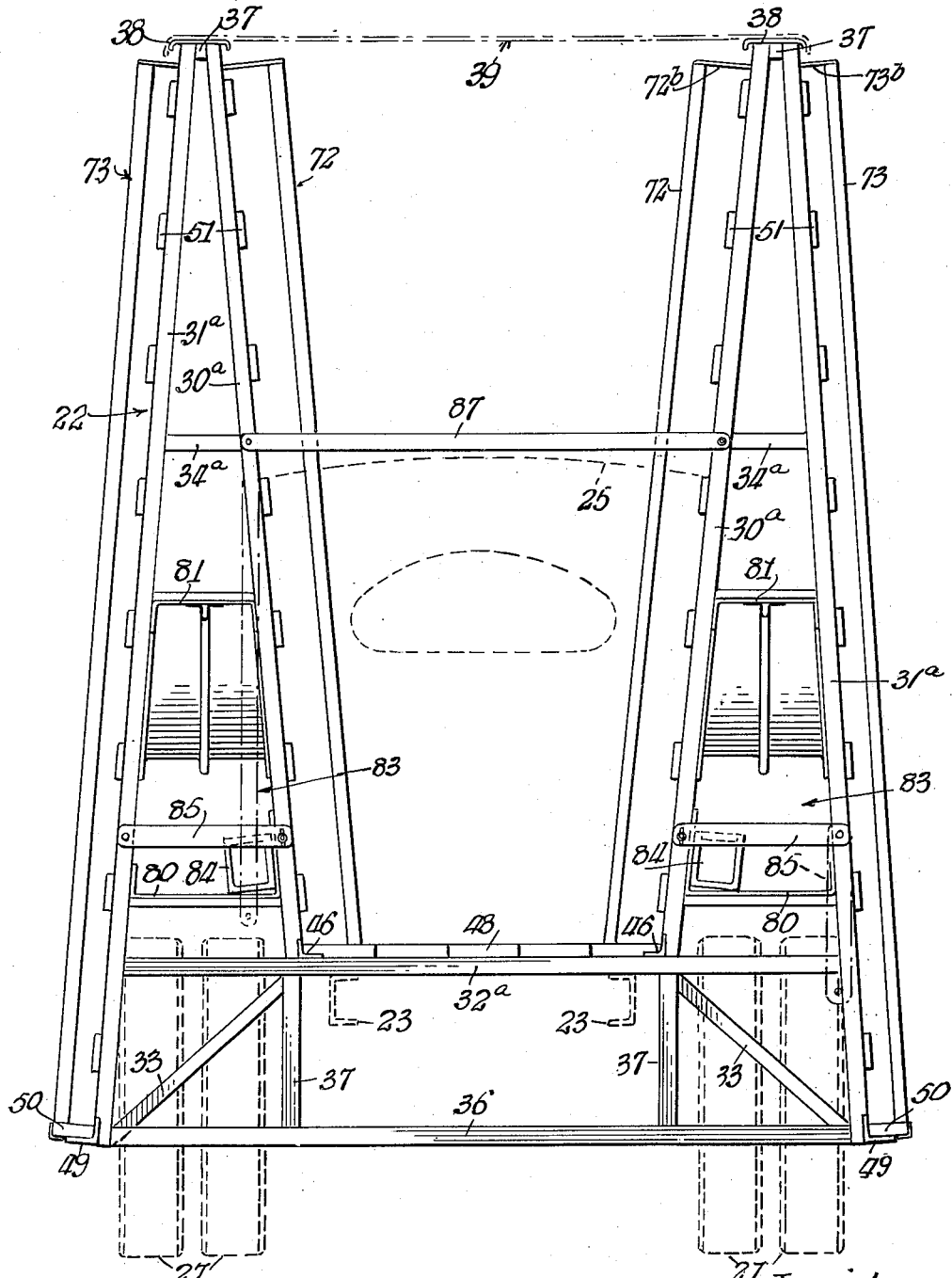
Fig. 2 is a rear end elevational view of the structure appearing in Fig. 1 on an enlarged scale.

The rear end frame 22 (see (Figs. 2 and 5) is of the same general structure and includes pairs of inner and outer stakes 30a and 31a, a cross sill 32a and cross stays 34a—35a. The bottom end extremities of the outer stakes of both pairs of stakes of said frame are connected by a reach bar 36 and upright posts 37 are disposed between and are welded to the sill 32a and reach bar 36 respectively. The sill 32a of this frame rests upon and is fixed to the rear end of the frame members 23 of the truck chassis.

The frame 19 (see Fig. 6) includes pairs of inner and outer stakes 30b and 31b that are connected together by the cross stays 34b and 35b, the outer stakes in this case being the shorter ones. The bottom ends of the inner stakes 30b extend below the stays 35b and are connected together by a cross sill 32b which rests upon and is fixed to the members 23 of the chassis frame.

When the frames 15 to 22 inclusive are disposed upon the chassis members 23 of a motor truck, they are equally spaced apart longitudinally thereof as appears in Fig. 1 and the cross sills 32, 32a and 32b provide the attachment for the bottom end portions of said frames with the chassis frame. The upper ends of said pairs of inner and outer stakes of all of said frames, at each side of the rack are fixed to opposite sides of a longitudinally extending member 37 and said member and the open top end of the associated stakes are closed by a longitudinally extending cover strip 38. This strip is in the form of an inverted channel and said strips provide a good support for a removable tarpaulin cover that is indicated by the dotted lines 39 in Fig. 2.

In the outer wall of each stake 30—31, 30a—31a and 30b—31b, near the upper end thereof is an elongated opening 40 and 41 respectively and slightly below the same are smaller openings 42 and 43 respectively, the purpose of which will appear later. These openings best appear in Fig. 10.

The outer stakes 31, 31a and 31b at the same side of the rack structures are connected together, in substantially the plane of the cross stays 35, 35a and 35b by means of short pieces of tubing 45, which are indicated in dotted lines in Fig. 1, and best appear in cross section in Fig. 10.

The bottom ends of the inner stakes of all of said frames, are connected together and to the associated sills 32, 32a and 32b by means of angle bars 46—46 and fixed to said sills between said bars are wooden planks forming a floor 48.

The bottom ends of the outer stakes of all of the frames at each side of the rack, except the frame 19, extend a distance below the axis of the rear wheels 27 and the bottom ends of the outer stakes of the frames 15, 16, 17 and 18 and of the frames 20, 21 and 22 are connected by angle bar sections 49, which has a gap therein between the frames 18 and 20 respectively. Engaged on said angle bar sections associated with the frames 15 to 18 inclusive and with the frames 20 to 22 inclusive, are sections of a wooden bar 50 for the non-nicking engagement by the bottom edges of certain of the glass panes to be transported. The wooden bar 50 is secured to the member 49 by means of countersunk bolts. The wooden bars 50—50 have a gap therein between the frames 18 and 20 respectively, but this gap is normally closed by a part associated with a removable panel, and which will be later described.

The outer and inner stakes of the frames, at each side of the rack are further connected together on the outside of said stakes by means of vertically spaced, longitudinally extending bar-like members 51—52 against which the glass panes 53—54, to be transported, engage and are held against movement, as will later appear. Preferably, each member 51—52 is constituted by a sheet metal channel 55 that is welded to said stakes and each channel has attached thereto a strip of cushioning material 56, as best appears in Fig. 10. Preferably said material is a good grade of rubber or the like, which affords the cushioning action desired and with which the glass panes may engage without becoming scratched. Furthermore such strips 56 absorb vibrations when the vehicle is under way so that said panes are less liable to become damaged because of said vibrations.

The lowermost members 51a, associated with the outer stakes at each side of the rack, are made in front and rear sections 51b and 51c respectively (see Figs. 1 and 7) and terminate at their facing ends in the plane of the frames 18 and 20 respectively, thus leaving a gap in said member between said frames.

At each side of the rack are front and rear panel fixed sections 57 and 58 respectively that terminate at their inner ends in the planes of the frames 18 and 20 to leave a gap therebetween, in line with and of a width greater than that of the rear wheels 27. The bottom edges of said panel sections engage upon the upright flange of the bar sections 49 and the top edges of said panel sections terminate at the bars 45 before mentioned. These panel sections close the bottom outside front and rear portions of the rack forwardly and rearwardly of the rear wheels, the intermediate bottom outside portion of the rack being closed by a removable panel 59, which best appears in Fig. 7. This panel is provided on the outer face thereof with a longitudinal member 51x which is disposed to line up with the sections 51b and 51c of the member 51a, joining therewith by means of the angular end surfaces 51y that best appear in Fig. 7.

The top margin of the panel has an angle bar 60 (see Figs. 7, 8 and 9) fixed to the inner surface thereof and which is adapted to engage under the bar sections 45—45 disposed between the outer fixed stakes of the frames 18—19 and 19—20 respectively.

The gap between spaced apart ends of the angle bar sections 49—49 at each side of the rack is normally closed by a bridge bar 61 of wood (see Figs. 7 and 8) and which has a bevelled end engagement with the cushion bars 50 carried by said angle bar sections. This bridge bar is faced along the outside with one angle bar 62 and along the inside is provided with longitudinally spaced angle clips 63, the upright flange of which is disposed inwardly of the inner edge of the bridge piece 61, as to leave a space 64 (see Fig. 8) to receive the lower margin of the panel 59.

The bar sections 45 at each side of the rack between the frames 18—19 and 20 each carries a spring pressed releasable locking pin 65, best appearing in Figs. 8 and 9. This pin has sliding engagement in the upper and lower walls 45a—45b of the associated bar section and is pivotally connected at its upper end as at 66 with a cam lever 67 engaged with an angle clip 68 on said wall 45a. A pin 69 passes through a part of the pin 65 on the inside of the bar section and a spring 70 surrounds the pin 65 between the pin 69 and upper wall 45a of the bar section. When the cam lever 67 is in the horizontal position shown in Fig. 9, the pin 65 extends through a hole 60a in the horizontal flange of the angle bar 60 at the top margin of the panel. When the bottom margin of the panel 57 is engaged in spaces 64, between the bridge piece 61 and angle bar clips 63 and the top edge of the angle bar 60 is disposed under the bar sections 45 between the frames 18—19 and 20, the lever 67 when swung downwardly to the horizontal position shown in Fig. 9 will enter the holes 60a in said bar 60. This releasably locks the panel in place to close the gap between and to form a continuation of the panel sections 51b and 51c. When the panel 59 is in this position, its vertical end edges overlap halfway upon the lower portions of the outer stakes of the frames 18 and 20 and there have a meeting engagement with associated end edges of the panels 51b and 51c, as best appears in Fig. 7.

It is apparent that when the panel is in this position, it covers the greater upper portion of associated rear wheel 27 of the vehicle. When such a wheel requires servicing, the panel is removed as follows: By swinging the cam levers 67 for each panel into an upright position, this will retract the locking pin 65 from the holes 60a in the angle bar 60, against the action of the springs 70 which now function to hold said levers in the upright position. The upper margin of the panel is then swung outwardly so that the angle bar clears that member 51 along the outside of the bars 45 and moves into the position shown at the right hand side of Fig. 3. By lifting upwardly on said panel, its bottom margin is released from the spaces 64 for a free removal of the panel. Thereafter the bridge bar 61 and parts carried thereby are removed to expose the wheel for such servicing as may be required. After such servicing, the bridge piece 61 is replaced and thereafter the bottom margin of the panel is slipped into the spaces 64. The top margin of the panel is then swung inwardly into position wherein its angle bar 60 is positioned beneath the bars 45 after which the cam levers 67 are swung to horizontal position and at which time the pins 65 enter the holes 60a in said angle bars to again lock the panel in place.

Associated with each of the inner and outer fixed stakes of all of the frames at each side of the rack are removable inner and outer shorter and longer stakes which carry adjustable clamps to engage the glass panes being transported to hold them tightly against the cushion members 51 and associated sections 51a, 51b and 51x and against such movement as would cause a rubbing and a scratching of said panes.

The inner removable stakes, each of which is indicated at 72, is of a length to extend from the floor 48 to substantially the bar 37, and therefore approximate the inner fixed stakes 30, 30a and 30b in length. The outer removable stakes, each of which is indicated at 73, is of a length to extend from the cushion members 50 to the bar 37 and therefore approximate the outer fixed stakes 31, 31a and 31b in length. Preferably there is a removable stake associated with each fixed stake and each removable stake is preferably made of the same kind of stock as the fixed stakes; namely, square tubing. Each stake 72 is provided at its bottom end with a tongue-like projection 72a (see Fig. 10) adapted to be entered into a suitable recess 48a provided therefor in the floor 48 as in Fig. 10. At the upper end of each stake 72 is a lateral arm 72b having a downturned hook 72c that carries a stud 72d. The hooked end of said arm is of such width as to be capable of passing through the slot or opening 40 in the associated stationary stake. When the projection 72a is entered in a recess 48a and the hooked end of the arm 72b is disposed within the upper end of the associated stake, the stud 72d thereof will line up with the hole 42 below said opening 40.

The stakes 73 are provided with similar parts indicated at 73a—73b—73c and 73d respectively. The extension 73a at the bottom end of a stake 73 is adapted to be entered in a space 50a (see Fig. 10) provided therefor in the cushion member 50. The parts 73b, 73c and 73d are adapted for entry through the slots 41 of the associated fixed stake and at that time, the studs 73c will enter a hole 43 in the associated fixed stake.

Each stake 72—73 carries a plurality of laterally extending studs 74, one for each associated cushion strip 51 and each stud is adapted to be engaged in a slot 75 in a clamp 76. This clamp carries a rubber foot 77 at one end to engage the glass pane being transported. Each stud carries a wing nut 78 whereby the clamp may be locked to the associated stake with its foot tightly engaged with the glass pane. The parts mentioned above best appear in Fig. 10.

In Fig. 10 the parts just heretofore described and disposed at one side of the rack as a whole, are shown in a position holding the glass panes against the cushion members 51. In this instance, when the clamps 76 have been tightened against the glass panes, they will exert a lateral pressure on the stakes 72—73 and as the studs 72d—73d at this time are engaged in the holes 42 and 43 in the fixed stakes, the stakes 72—73 are locked against upward movement. Thus under the jolting the rack may receive when the associated vehicle is under way, the stakes 72—73 cannot "jump" upwardly to become loose or displaced.

To remove a glass pane, the nuts 78 are loosened and the clamps 76 withdrawn from engagement with the glass panes. The upper ends of the stakes are then swung inwardly toward the associated fixed stake so that the studs 72d and 73d of said stakes 72—73 are released from the holes 42—43 therein. An upward lift on the stake 72—73 moves the arm 72b or 73b upwardly in the associated slot 40—41 into that position wherein the hooks on said arm may be withdrawn from the recesses in which they were previously engaged so that the stakes 72—73 with the clamps 76 thereon may be removed from the rack. This exposes the entire side of the pane for removal, either laterally of the rack or longitudinally thereof as may be desired.

In installing large glass panes in their frames as for show window and other places, certain appurtenances, such as ladders, planks, straight edges, rulers and the like, of substantial length, are necessary and are carried to each installation. At each side of the rack, in the space between the fixed stakes thereof, I provide a longitudinal tray 80 that rests upon cross bars 35—35a and 35b at each side of the rack structure. A longitudinal cover 81 is arranged above each tray and extends downwardly from the rear end of the rack toward the front end. The tray and rack mentioned provide a compartment 82 (see Fig. 3) for the edgewise reception of certain ladders and planks and in said compartment, toward one side of the tray, is located a longitudinal box 84, to receive certain straight edges and rulers and the like in a manner protecting them against being nicked or otherwise damaged. The fixed stakes at the rear end of the same side of the rack cooperate for the support of a bar 85, which extends across the rear end of the compartment 82 to hold the ladders and planks or the like in place in said compartment. This bar is pivoted at one end to one of said fixed stakes and has a detachable connection at its other end with the other stake. This connection, when released, permits the bar to swing into a vertical out-of-the-way position, as indicated at the right hand side of Fig. 2, in dotted lines.

For carrying planks, ladders and the like, which are longer than the rack itself, I provide, at the front of the rack, a canopy 86 that overhangs the cab 25 of the vehicle, as appears in Fig. 1. This canopy is fixed to and projects forwardly from the fixed stakes of the front frame 15. In association with this canopy I provide at the rear end of the rack structure, and in the horizontal plane of the canopy, a cross bar 87. This bar is pivoted to one of the fixed inner stakes 30a at one end and has a detachable connection at its other end to the other inner stake of the rear frame. When the detachable connection is released, the bar 87 may be swung into the dotted line vertical position shown at the left hand side of Fig. 2 in dotted lines.

By means of the rack structure described, the glass panes being transported are securely held in position during transport and therefore cannot become damaged. The removable stakes may be quickly applied to or removed from the rack structure, to permit easy loading and unloading of the glass panes. Also, by reason of the structure described, the wheels of the vehicle are normally covered by the panels which may be readily removed to permit servicing of the rear wheels of the vehicle.

In describing the invention, I have referred in detail to the form, arrangement and construction of the parts embodied in the improved rack structure, the same is to be considered only in the illustrative sense and therefore I do not wish to be limited thereto except as may be specifically set forth in the appended claims.

I claim as my invention:

1. In a rack structure for a glazier's vehicle, a plurality of longitudinally spaced, transversely extending frames, each including at each side thereof, a pair of generally upright inner and outer stationary stakes and means connecting bottom ends thereof to parts of the associated frame, the inner and outer stakes of each pair converging toward their top end, longitudinal means connecting the top ends of the inner and outer stakes on one side of the rack together, a set of vertically spaced, longitudinal members fixed to the outside of the inner and the outer stakes of the pairs of stakes of all of said frames for engagement by the face of the glass panes adapted to be carried by the rack structure, means extending longitudinally of the bottom portions of the like stakes of both pairs of stakes of said frames for an edge supporting and engagement by said glass panes, glass pane retaining stakes, each removably associated with and spaced laterally outward from at least certain of the stationary stakes of both pairs of stakes of all of said frames, coacting means on the bottom end parts of said glass pane retaining stakes and on said longitudinally extending means respectively for providing a detachable engagement therebetween, an arm extending laterally inward from the top end of each glass pane retaining stake and provided with an angular hook for lateral entry into and then a longitudinal movement in a recess in the upper end of the associated stationary stake for detachably holding said glass pane retaining stake in its pane retaining position and means mounted on at least certain of said retaining stakes for adjustment laterally thereof into clamping engagement with the glass pane between the same and the associated stationary stakes for holding the pane against movement.

2. In a rack structure for a glazier's vehicle, a plurality of longitudinally spaced, transversely extending frames each including at each side thereof, a pair of generally upright inner and outer stationary stakes and means connecting bottom ends thereof to parts of the associated frame, the inner and outer stakes of each pair converging toward their top end, longitudinal means connecting the top ends of the inner and outer stakes on one side of the rack together, a set of vertically spaced, longitudinal members fixed to the outside of the inner and the outer stakes of the pairs of stakes of all of said frames for engagement by the face of the glass panes adapted to be carried by the rack structure, means extending longitudinally of the bottom portions of the like stakes of both pairs of stakes of all of said frames for an edge supporting and engagement by said glass panes, glass pane retaining stakes, each removably associated with and spaced laterally outward from at least certain of the stationary stakes of both pairs of stakes of said frames, coacting means on the bottom end parts of said glass pane retaining stakes and on said longitudinally extending means respectively for providing a detachable engagement therebetween, an arm extending laterally inward from the top end of each glass pane retaining stake and provided with an angular hook for lateral entry into and then a longitudinal movement in a recess in the upper end of the associated stationary stake for detachably holding said glass pane retaining stake in its pane retaining position and means mounted on at least certain of said retaining stakes for adjustment laterally thereof into clamping engagement with the glass pane between the same and the associated stationary stakes for holding the pane against movement, and coacting means on said hook of each retaining stake and its associated stationary stake for preventing relative longitudinal movement therebetween when said last mentioned means is in clamping engagement with said glass pane.

3. In a rack structure for a glazier's vehicle, a plurality of longitudinally spaced, transversely extending frames, each including at each side thereof, a pair of generally upright inner and outer stationary stakes and means connecting bottom ends thereof to parts of the associated frame, the inner and outer stakes of each pair converging toward their top end, longitudinal means connecting the top ends of the inner and outer stakes on one side of the rack together, a set of vertically spaced, longitudinal members fixed to the outside of the inner and the outer stakes of the pairs of stakes of all of said frames for engagement by the face of the glass panes adapted to be carried by the rack structure, means extending longitudinally of the bottom portions of the like stakes of both pairs of stakes of all of said frames for an edge supporting and engagement by said glass panes, glass pane retaining stakes, each removably associated with and spaced laterally outward from at least certain of the stationary stakes of both pairs of stakes of said frames, means extending longitudinally from the bottom end of each retaining stake and adapted for detachable engagement in coacting recesses in said longitudinally extending means, an arm extending laterally inward from the top end of each retaining stake and provided with an angular hook for lateral entry into and then a longitudinal movement in a recess in the upper end of the associated stationary stake for detachably holding said retaining stake in its pane retaining position, and means mounted on at least certain of said retaining stakes for adjustment laterally thereof into clamping engagement with the glass pane between the same and the associated stationary stakes for holding the pane against movement.

4. In a rack structure for glazier's vehicles, a plurality of longitudinally spaced, transversely extending frames, each including at each side thereof inner and outer tubular stationary stakes and means connecting bottom end parts thereof to parts of the associated frame, the inner and outer stakes of each pair converging toward their top ends and each there provided with a longitudinal opening and a smaller opening therebelow, longitudinal means connecting the top ends of the inner and outer stakes at each side of the rack together, a set of vertically spaced longitudinal members fixed to the outside of the inner and the outer stakes of the pairs of stakes of all of said frames for engagement by the face of the glass panes adapted to be carried by the rack, means extending longitudinally of the bottom portions of the like stakes of both pairs of stakes of all of said frames for an edge supporting engagement by said glass panes, glass pane retaining stakes, each removably associated with and spaced laterally outward from at least certain of said stationary stakes of both pairs of stakes of said frames, coacting means on the bottom end part of the glass pane retaining stakes and on said longitudinally extending means respectively, for providing a detachable engagement therebetween, an arm extending laterally inward from the top end of each glass pane retaining stake and provided with an angular hook for lateral entry into and then a longitudinal movement in said recess in the upper end of the associated stationary stake for detachably holding said glass pane retaining stake in pane retaining position and means carried by at least certain of said retaining stakes for adjustment laterally thereof into clamping engagement with the glass pane between the same and the associated stake for holding the same against movement.

5. In a rack structure for glazier's vehicles, a plurality of longitudinally spaced, transversely extending frames, each including at each side thereof inner and outer tubular stationary stakes and means connecting bottom end parts thereof to parts of the associated frame, the inner and outer stakes of each pair converging toward their top ends and each there provided with a longitudinal recess and a smaller hole therebelow, longitudinal means connecting the top ends of the inner and outer stakes at each side of the rack together, a set of vertically spaced longitudinal members fixed to the outside of the inner and the outer stakes of the pairs of stakes of all of said frames for engagement by the face of the glass panes adapted to be carried by the rack, means extending longitudinally of the bottom portions of the like stakes of both pairs of stakes of all of said frames for an edge supporting engagement by said glass panes, glass pane retaining stakes, each removably associated with and spaced laterally outward from at least certain of said stationary stakes of both pairs of stakes of all of said frames, coacting means on the bottom end part of the glass pane retaining stakes and on said longitudinally extending means respectively, for providing a detachable engagement therebetween, an arm extending laterally inward from the top end of said glass pane retaining stake and provided with an angular hook for lateral entry into and then a longitudinal movement in said recess in the upper end of the associated stationary stake for detachably holding said glass pane retaining stake in pane retaining position, means carried by at least certain of said retaining stakes for adjustment laterally thereof into clamping engagement with the glass pane between the same and the associated stake for holding the same against movement, and a stud carried by the hook of each retaining stake for engagement in said hole below a recess in the associated stationary stake for preventing relative longitudinal movement therebetween when said last mentioned means is in clamping engagement with said glass pane.

6. In a rack structure for glazier's vehicles, a plurality of longitudinally spaced transversely extending frames, each including at each side thereof a pair of generally upright inner and outer stationary stakes and means connecting the bottom ends thereof to parts of the associated frames, the inner and outer stakes of each pair converging toward their top ends, longitudinal means disposed between and connecting the top ends of the inner and outer stakes on one side of the rack together, vertically spaced metallic members fixed to the outside of the inner and the outer stakes of the pairs of stakes of all of said frames for connecting them together, and cushioning means carried by each of said members for a face engagement by the glass panes to be carried by the vehicle.

7. A glass pane retaining stake for the rack structure of a glazier's vehicle embodying therein an elongated member, means providing a tongue extending longitudinally from one end of said member, an arm projecting laterally from the other end of said member and terminating in a downturned end provided with a stud on its inner surface that faces said member, and means spaced longitudinally along one side of said member providing outwardly extending threaded studs, each stud receiving a glass pane clamping member.

8. A glass pane retaining stake for the rack structure of a glazier's vehicle and embodying therein an elongated piece of tubing of rectangular cross section having a tongue extending longitudinally from one end, an arm welded to the other end of said tubing and extending laterally therefrom and terminating in a downturned hook, a stud on the inside of said hook and a plurality of threaded studs spaced longitudinally of and welded to one side of said tubing, each stud receiving a glass pane clamping member.

9. In a rack structure for a glazier's vehicle having a chassis and rear wheels, said structure embodying therein longitudinally spaced, transversely extending frames, each including at each side thereof a pair of generally upright inner and outer stakes, which converge toward their top ends, longitudinal means connecting the top ends of the inner and outer stakes at each side of the rack structure, means connecting the bottom end portions of the stakes of one side of each frame with those on the other side thereof, a part of said connecting means being adapted to engage upon and fixed to the chassis of the vehicle, a plurality of vertically spaced longitudinally extending members fixed to the outside of the inner and the outer stake of the pairs thereof at each side of the rack structure for the leaning support of the glass pane adapted to be transported, means extending longitudinally of the bottom ends of the outer stakes at each side of the rack structure for edge-like supporting engagement by said glass pane, the bottom portions of said outer stakes extending below the axis of said wheels, panel portions fixed to said bottom portions of certain of said stakes arranged forwardly and rearwardly of said wheels to leave a gap therebetween wider than the diameter of said wheels, a bridge member closing the bottom of said gap and forming a continuation of said longitudinally extending means associated with said outer stakes, a removable panel for closing said gap and detachably engaged at its bottom end with said bridge member and at its sides engaging parts of said outer stakes at each side of said gap and means for detachably fastening the top end of said removable panel in place.

10. In a rack structure for a glazier's vehicle having a chassis and rear wheels, said structure embodying therein longitudinally spaced, transversely extending frames, each including at each side thereof a pair of generally upright inner and outer stakes, which converge toward their top ends, longitudinal means connecting the top ends of the inner and outer stakes at each side of the rack structure, means connecting the bottom end portions of the stakes of one side of each frame with those on the other side thereof, a part of said connecting means being adapted to engage upon and fixed to the chassis of the vehicle, a plurality of vertically spaced longitudinally extending members fixed to the outside of the inner and the outer stakes of the pairs thereof at each side of the rack structure for the leaning support of the glass pane adapted to be transported, means extending longitudinally of the bottom ends of the outer stakes at each side of the rack structure for edge-like supporting engagement by said glass pane, the bottom portions of said outer stakes extending below the axis of said wheels, panel portions fixed to said bottom portions of certain of said stakes arranged forwardly and rearwardly of said wheels to leave a gap therebetween wider than the diameter of said wheels, a bridge member closing the bottom of said gap and forming a continuation of said longitudinally extending means associated with said outer stakes, means carried by said bridge member and coacting therewith in forming a pocket along one side thereof, a removable panel for closing said gap and at its bottom margin being formed for engagement in said pocket and at its sides being formed for engagement with parts of said outer stakes at each side of said wheels, and means for detachably fastening the top ends of said panels in place.

11. In a rack structure for a glazier's vehicle having a chassis and rear wheels, said structure embodying therein longitudinally spaced, transversely extending frames, each including at each side thereof a pair of generally upright inner and outer stakes, which converge toward their top ends, longitudinal means connecting the top ends of the inner and outer stakes at each side of the rack structure, means connecting the bottom end portions of the stakes of one side of each frame with those on the other side thereof, a part of said connecting means being adapted to engage upon and fixed to the chassis of the vehicle, a plurality of vertically spaced longitudinally extending members fixed to the outside of the inner and the outer stake of the pairs thereof at each side of the rack structure for the leaning support of the glass pane adapted to be transported, means extending longitudinally of the bottom ends of the outer stakes at each side of the rack structure for edge-like supporting engagement by said glass pane, the bottom portions of said outer stakes extending below the axis of said wheels, panel portions fixed to said bottom portions of certain of said stakes arranged forwardly and rearwardly of said wheels to leave a gap therebetween wider than the diameter of said wheels, a bridge member closing the bottom of said gap and forming a continuation of said longitudinally extending means associated with said outer stakes, means connecting parts of said outer stakes together at substantially the plane of the upper edges of said panel sections, a removable panel for closing said gap and detachably engaged at its bottom margin with said bridge member and at its sides engaging parts of said outer stakes at each side of said gap, and means for detachably connecting the upper marginal part of the removable panel to said means connecting parts of said stakes together.

12. In a rack structure for a glazier's vehicle having a chassis and rear wheels, said structure embodying therein longitudinally spaced, transversely extending frames, each including at each side thereof a pair of generally upright inner and outer stakes, which converge toward their top ends, longitudinal means connecting the top ends of the inner and outer stakes at each side of the rack structure, means connecting the bottom end portions of the stakes of one side of each frame with those on the other side thereof, a part of said connecting means being adapted to engage upon and fixed to the chassis of the vehicle, a plurality of vertically spaced longitudinally extending members fixed to the outside of the inner and the outer stakes of the pairs thereof at each side of the rack structure for the leaning support of the glass pane adapted to be transported, means extending longitudinally of the bottom ends of the outer stakes at each side of the rack structure for edge-like supporting engagement by said glass pane, the bottom portions of said outer stakes extending below the axis of said wheels, panel portions fixed to said bottom portions of certain of said stakes arranged forwardly and rearwardly of said wheels to leave a gap therebetween wider than the diameter of said wheels, a bridge member closing the bottom of said gap and forming a continuation of said longitudinally extending means associated with said outer stakes, means carried by said bridge member and coacting therewith in forming a pocket along one side thereof, a removable panel for closing said gap and at its bottom margin being formed for engagement with parts of said outer stakes at each side of said wheels, means connecting parts of said outer stakes together at substantially the plane of the upper edges of said panel section, a flange extending inwardly from the upper margin of said removable panel and adapted to engage under said last mentioned means and means carried by said last mentioned means and adapted to be retractably engaged with openings in said flange to releasably lock the upper margin of said removable panel section in position.

13. In a rack structure for a glazier's vehicle, a plurality of longitudinally spaced, transversely extending frames, each including at each side thereof, a pair of generally upright inner and outer stationary stakes and means connecting the bottom ends thereof to parts of the associated frame, the inner and outer stakes of each pair converging toward their top end, a cross member connecting parts of the inner and outer stakes of each pair of stakes at each side of the rack structure together, a longitudinal tray member disposed between and extending longitudinally of the inner and outer stakes at least at one side of the rack structure and supported upon said cross members, and longitudinal means spaced above said tray member and coacting therewith in providing a storage space for appurtenances incidental to the installation of the transported glass pane.

14. In a rack structure for a glazier's vehicle, a plurality of longitudinally spaced transversely extending frames, each including at each side thereof a pair of generally upright inner and outer stationary stakes and means adapted for attachment to the frame of said vehicle, connecting bottom end portions of said inner and outer stakes at one side of the associated frame to those on the other side of said associated frame, the inner and outer stakes of each pair converging toward their top ends, longitudinal means connecting the top ends of the inner and outer stakes at one side of the rack structure together, and transverse members connecting the inner and outer stakes at each side of each frame together and vertically spaced, longitudinal members fixed to the outside of the inner and outer stakes of all of said frames together and adapted for a face engagement by the glass pane to be transported.

15. In a rack structure for a glazier's vehicle, the combination of a plurality of generally upright longitudinally spaced stakes, connected together by a plurality of vertically spaced longitudinally extending members to provide a fixed structure, with a plurality of glass pane retaining stakes, each removably associated with and spaced laterally away from at least certain of the stakes of the fixed structure, means on the bottom and top of the pane retaining stakes coacting with parts of the fixed structure providing detachable engagement between the pane retaining stakes and the associated stakes of the fixed structure, said means including an arm extending laterally of the top of one stake for a hooked engagement with means at the top of the associated stake.

16. In a rack structure for a glazier's vehicle, the combination of a plurality of generally upright longitudinally spaced stakes, connected together by a plurality of vertically spaced longitudinally extending members to provide a fixed structure, with a plurality of glass pane retaining stakes, each removably associated with and spaced laterally away from at least certain of the stakes of the fixed structure, means on the bottom and top of the pane retaining stakes coacting with parts of the fixed structure providing detachable engagement between the pane retaining stakes and the associated stakes of the fixed structure, said means including an arm extending laterally of the top of the pane retaining stake for a hooked engagement with means at the top of the associated stationary stake.

17. In a rack structure for a glazier's vehicle, the combination of a plurality of generally upright longitudinally spaced stakes, connected together by a plurality of vertically spaced longitudinally extending members to provide a fixed structure, with a plurality of glass pane retaining stakes, each removably associated with and spaced laterally away from at least certain of the stakes of the fixed structure, means on the bottom and top of the pane retaining stakes coacting with parts of the fixed structure providing detachable engagement between the pane retaining stakes and the associated stakes of the fixed structure, said means including an arm extending laterally of the top of one stake for hooked and pin locking engagement with means at the top of an associated stake.

18. In a rack structure for a glazier's vehicle, the combination of a plurality of generally upright longitudinally spaced stakes, connected together by a plurality of vertically spaced longitudinally extending members to provide a fixed structure, with a plurality of glass pane retaining stakes, each removably associated with and spaced laterally away from at least certain of the stakes of the fixed structure, means on the bottom and top of the pane retaining stakes coacting with parts of the fixed structure providing detachable engagement between the pane retaining stakes and the associated stakes of the fixed structure, said means including an arm extending laterally of the top of one stake for a hooked engagement with means at the top of the associated stake, and means at the bottom of the pane retaining stake removably interfitting with means at the bottom of the fixed structure.

19. In a rack structure for a glazier's vehicle having a chassis and rear wheels, said structure embodying at each side of the vehicle, longitudinally spaced generally inwardly leaning stationary stakes, one of said stakes being disposed in the plane of the axis of said wheels and terminating at its bottom end in a plane above said wheels, the other of said stakes forwardly and rearwardly of the wheels terminating in a plane below an upper portion of said wheels, a member connecting the bottom end of certain of said other stakes rearwardly of said wheels, a second member connecting the bottom end of certain of said other stakes forwardly of said wheels, the facing ends of said first and said second members being spaced apart to leave a gap therebetween, a bridge member spanning said gap between said ends of said first and said second members and coacting therewith in forming a continuous edge support for a pane of glass when transported in the rack, a plurality of longitudinally extending vertically spaced glass pane cushioning members fixed to the outside of said stakes, the lowermost cushioning member being disposed in the horizontal plane of the bottom end of said one of said stakes, a panel fixed to said certain of said other stakes rearwardly of said wheels, below said lowermost cushioning member, a second panel fixed to said certain of said other stakes forwardly of said wheels, longitudinally aligned glass pane cushioning members fixed to said first and second panels, said lowermost cushion member, said bridge member and said first and second panels defining an open space outwardly of the wheels for a servicing thereof, a third panel section adapted to be removably placed in said open space to close the same and supported at the bottom upon said bridge member, and means associated with the upper portion of said third panel for detachably locking the same in the rack structure.

LOUIS KRAFT.

REFERENCES CITED

The following references are of record in the file of this patent:

UNITED STATES PATENTS

| Number | Name | Date |
|---|---|---|
| 1,535,128 | Milner | Apr. 28, 1925 |
| 1,587,541 | Metzler et al. | June 8, 1926 |
| 1,889,350 | Cohen-Venezian | Nov. 29, 1932 |
| 2,066,478 | Lewin, Jr. | Jan. 5, 1937 |
| 2,216,553 | Greene et al. | Oct. 1, 1940 |
| 2,343,844 | Milburn et al. | Mar. 7, 1944 |